United States Patent [19]

Saur

[11] 4,420,355

[45] Dec. 13, 1983

[54] RIBBON APPLICATOR HEAD

[75] Inventor: Walter Saur, Ditzingen, Fed. Rep. of Germany

[73] Assignees: Bedford Industries, Inc., Worthington, Minn.; Robert Bosch GmbH, Stuttgart, Fed. Rep. of Germany

[21] Appl. No.: 364,034

[22] Filed: Mar. 31, 1982

[51] Int. Cl.³ ........................ B32B 31/18; B32B 35/00

[52] U.S. Cl. .................................... 156/250; 156/256; 156/517; 156/521; 156/522; 156/530

[58] Field of Search ............... 156/250, 256, 384, 517, 156/518, 521, 522, 530

[56] References Cited

U.S. PATENT DOCUMENTS

| | | | |
|---|---|---|---|
| 3,577,303 | 5/1971 | Buck | 156/522 |
| 3,886,033 | 5/1975 | MacDonald et al. | 156/522 |
| 4,274,903 | 6/1981 | Mock | 156/522 |
| 4,331,498 | 5/1982 | Pagay et al. | 156/517 |

*Primary Examiner*—Caleb Weston
*Attorney, Agent, or Firm*—Edwin E. Greigg

[57] ABSTRACT

An applicator head is disclosed which accumulates, feeds, cuts and presents a preselected length of ribbon-like material. A first pneumatic cylinder is connected to a pivoting arm which controls accumulation and feeding steps, while a second pneumatic cylinder operates an applicator arm, to cut and present the material. The connection of the pivoting arm, relative to the first cylinder, determines the length of the cut material or ribbon segment.

16 Claims, 9 Drawing Figures

RIBBON APPLICATOR HEAD

BACKGROUND OF THE INVENTION

The present invention relates to a mechanism which accumulates, feeds, cuts and presents a length of ribbon-like material which is then adhered to a desired item.

Fruits, vegetables and other perishable items are often packed in sealed plastic bags. Once the bag is opened, however, it is difficult to completely re-close the bag which subjects the contents to contamination. Tie-wraps are frequently provided for re-sealing of bags, but are applied to the bag with complicated machinery. The tie-wraps are also easily lost or broken during normal use. A second device for resealing is a tie-wrap which is made integral with the bag. See U.S. Pat. Nos. 3,148,598 to Davis; 3,418,891 to Rivman et al; and 3,859,895 to White. Thus in the packaging industry it is often necessary to adhere a ribbon-like material to an object, bag or package. The ribbon-like material is usually stored in rolled lengths of material which are cut and then adhered. In the case of a tie-wrap, a length of wire integral with a plastic strip is stored on a roll, measured, dispensed, cut and applied to a bag for sealing or re-sealing purposes.

The measuring, dispensing, cutting and adhering of individual pieces or ribbon-like material is time consuming and thus expensive. Therefore, a need exists for a device which can automatically measure, cut and present a ribbon-like segment for application to a desired item.

Some attempts have been made in the prior art to realize such a device. However, these devices consist of many elements and are complicated in structure. In the prior art devices, separate controls, actuators and elements are provided which dispense, cut and apply a ribbon-like material. For instance, the previously mentioned patents to Davis, Rivman et al, and White all disclose separate dispensers, cutters and applicators which are individually controlled.

OBJECTS AND SUMMARY OF THE INVENTION

The invention relates to a single instrument which makes possible the automatic continuous application of a certain length or ribbon-like material to an implement in or on which it is desired to reside. The application is accomplished through the combined consecutive operations of ACCUMULATING a present length of ribbon, the subsequent and synchronous FEEDING or advancing of this ribbon length to a final location and into a desired position, CUTTING from the continuous length of feedribbon and PRESENTING the ribbon to the implement. Two pneumatic cylinders control the operation of the instrument to accomplish these steps. The first pneumatic cylinder is connected to control a pivoting arm. Upward motion of the pivoting arm causes a pair of pulleys to move on a lever in a manner which accumulates a length of ribbon. Downward motion of the pivoting arm causes two geared feed rolls to rotate which feeds the ribbon. The second pneumatic cylinder operates an applicator arm that cuts and presents the ribbon in one motion.

The overall operation of the instrument of applicator head 2 can best be described with reference to FIGS. 1 and 2, which show detail of the so called back plate 4 of the applicator head 2. The designations front plate and back plate are arbitrary. Their relative position and location can be seen in FIGS. 6 and 7. All the wheels, levers and handles for manual operation are located on the front side of the instrument, whereas the base plate 6 for mounting the applicator head 2 to e.g. a fill and form machine, is located on the back plate 4.

It is an object of the present invention to provide a device which:

(a) combines the functions of ribbon accumulation, ribbon feeding and subsequent cutoff and application of a ribbon;

(b) accomplishes this operation in an automatic, continuous fashion;

(c) lends itself to and functions in an on-line installation, (d) does so with a pre-selected, adjustable length of ribbon, regardless of shape, or size.

(e) lends itself to mechanical pneumatic or electrical activation and contol.

DETAILED DESCRIPTION OF THE PREFERRED EMBODIMENTS

Figure 1:
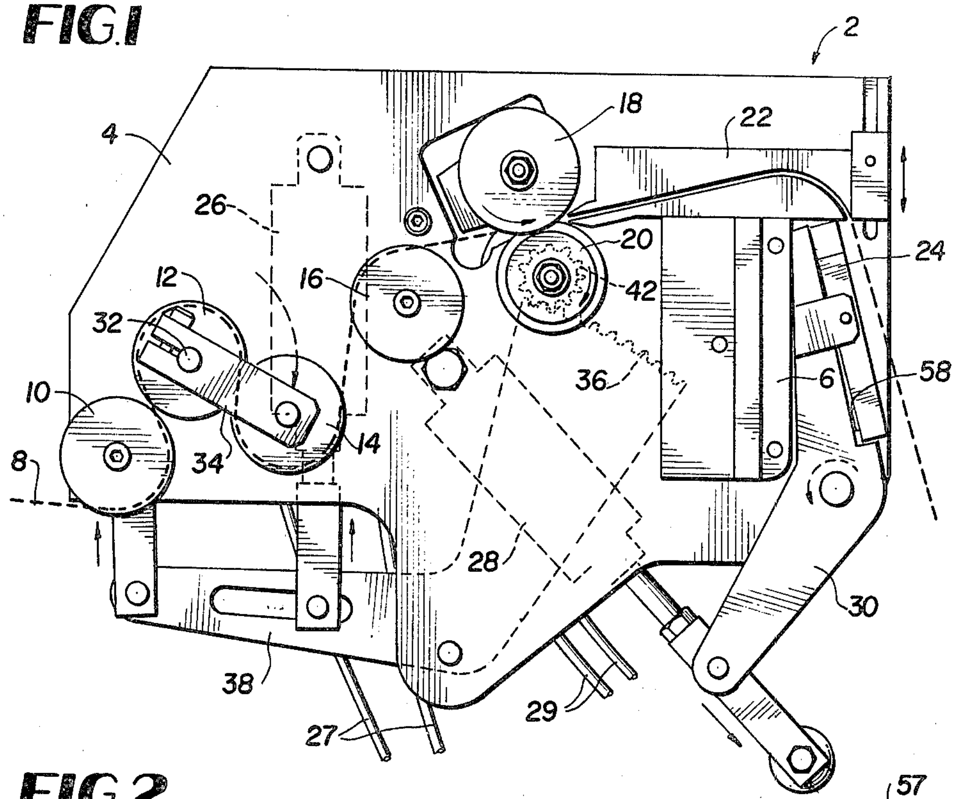
FIG. 1 is a block view of the present invention showing the path of the material to be cut.

FIG. 1 shows the material or ribbon path 8 which leads over four nylon idler guide pulleys 10, 12, 14, 16, between an upper 18 and lower 20 feed roll, through a directional guide 22 and onto the cut and seal applicator 24. All movement in the applicator head 2 is initiated and directed by the upward and downward movement of the pistons in the pneumatic cylinders number 26 and number 28. The positions of the pneumatic cylinders 26 and 28, between the front plate (see FIGS. 5, 6 and 7) and back plate 4, have been indicated with a dotted outline. The sequence of operations can therefore be conceived of as consisting of three major parts: the accumulation of ribbon material; the feeding of the material; and finally the cutting and application operation. As such, the four idler pulleys 10, 12, 14, 16 and their ancillary connecting rods and linkages make up the acumulator part. The feed section consists of the upper 18 and lower 20 feed roll, the back up gearing, a brake drum and a feed pressure fork mechanism to be discussed later in greater detail. Both the accumulation and feeding of the ribbon is activated by pneumatic cylinder 26. The cut and seal section essentially consists of pneumatic cylinder 28, which operates the cut and seal pivot arm 30 to affect the desired actions. The pneumatic cylinders 26, 28 are connected via supply lines 27, 29 to a supply and timing device which provides timed control of the cylinders to insure a smooth and systematic operation of the applicator head.

Figure 2:
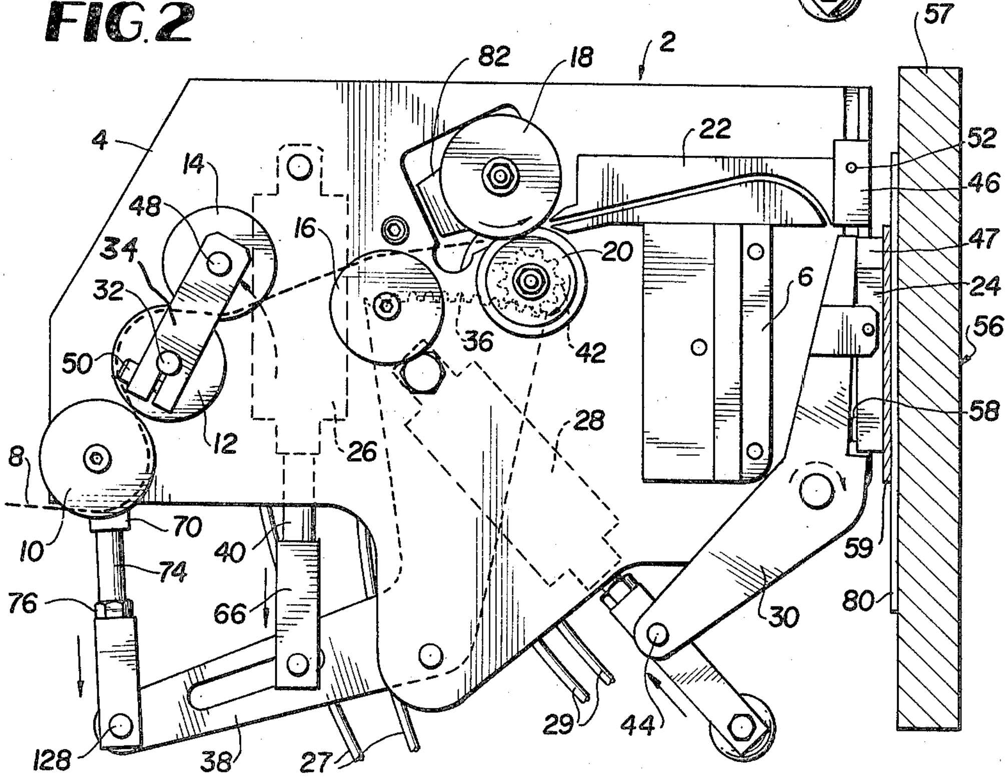
FIG. 2 shows the present invention at application of the material to an implement.

The three operations, accumulation, feeding and subsequent cutting and application of the ribbon, are illustrated in FIGS. 1, 2. FIG. 1 shows the applicator head 2 after accumulation or ribbon has been accomplished by the downward movement of idler guide pulley 14 which is connected to the accumulator shaft 32 via the pulley clamp lever 34. The downward movement of idler guide pulley 14 results in the accumulation of ribbon from a supply roll (not shown) at the left of the applicator head 2. Accumulation in this manner avoids excessive strain on feed rolls 18, 20. Backward movement of the ribbon from between the feed rolls 18, 20 is prevented by a special clutch arrangement (discussed later) in the feed section. The downward movement of the pulley clamp lever 34 and idler guide pulley 14 will have been affected by the upward movement of the piston in the pneumatic cylinder 26. The upper 18 and lower 20 feed rolls remain stationary during the accumulating operation. At the same time, the cut and seal pivot arm 30 remains in its most backward position as a result of the down position of the piston in pneumatic cylinder number 28. It will be noticed that the gear segment 36 at the end of the feed pivot arm 38 is in a position farthest to the right during the accumulation phase.

FIG. 2 shows the position of the various components after the second phase, that of feeding, following accumulation, has been accomplished. Idler guid pulley 14 has moved back in a counter clockwise direction to its most upper position as a result of the downward movement of the piston in pneumatic cylinder 26. The downward movement of ram cylinder 40 simultaneously pivots the feed pivot arm 38 and moves the gear segment 36 (see FIG. 1) at the end of the feed pivot arm 38 from its most extreme position to the right to its full left position, thereby effecting rotation of the upper 18 and lower 20 feed rolls via the lower shaft clutch gear 42 in the direction of the arrows. As a result of the clockwise rotation of the lower feed roll 20 and the counter clockwise rotation of the upper feed roll 18, the accumulated length of ribbon will be fed into and through the directional guide 22, in front of the cut and seal applicator 24.

FIG. 2 also illustrates the final operation in the full sequence, namely the cutting of the ribbon and the application to the specific implement. During this phase idler guide pulley 14 stays in its most upward position and the pneumatic cylinder 26 in its most downward position, while the upper 18 and lower 20 feed folls remain stationary. At this point the piston in pneumatic cylinder 28 is forced upward and as a result of its connection to the cut and seal pivot arm connecting rod 44, the cut and seal pivot arm 30 will rotate from its most backward position into a vertical position relative to FIG. 3. The described movement of the cut and seal pivot arm 30 will move the cutting edge 47 of this arm past the upper knife 46 thereby cutting the ribbon, which follows material path 8, in a shearing action. Since the knife 46 is positioned at the end of the path of the cut and seal pivot arm 30, the ribbon-like material is not cut until the last moment, which aids in the alignment of the cut ribbon portion with respect to a package to which the cut ribbon portion is to be adhered. The high-speed movement of the cut and seal pivot arm 30 also aids alignment in that the material is cut and sealed in such a quick manner that the cut material does not have a chance to slip out of position during the time interval between the steps of cutting and sealing. The operations of accumulation, feeding and cutting, as illustrated in FIGS. 1 and 2, will repeat themselves as long as the pneumatic cylinders 26 and 28 continue to be appropriately activated.

FIG. 2, shows some further significant detail. The idler guide pulleys numbers 10, 12, 14, 16 are all free floating, that is none of them are driven. Idler pulleys 10 and 16 are identical, while 12 and 14 are slightly different in small dimensional detail to conform to specific geometry of the device. Idler guide pulleys 10 and 16 are directly screw mounted into the back plate. Idler guide pulley 12 freely rotates on the accumulator shaft 32, while idler guide pulley 14 rotates freely on a short shaft 48 which is pressure fitted into the upper part of the pulley clamp lever 34. The pulley clamp lever 34 is held on the accumulator shaft 32 by the clamp screw 50 as shown. Pressure is exerted by the upper feed roll 18 onto the lower feed roll 20 via a feed pressure fork 82, of which only a small detail is shown in FIG. 2. This interfacial pressure assures the proper feeding of the ribbon and assists in preventing the backward flow of ribbon during the accumulation phase. The directional guide 22 merely serves the purpose of guiding the ribbon from its point of emergence between the upper 18 and lower 20 feed rolls, past the upper 46 and lower 47 knife onto the cut and seal applicator 24. The directional guide 22 is mounted by three Allenhead screws onto the back plate 4. A small steel block 46 with a special knife edge on the lower lefthand corner can be positioned vertically up and down, via a screw and slot arrangement 52 on the inside of the back plate 4. (see FIG. 3, upper left hand corner). The rectangular steel base plate 6 is mounted to the back plate 4 by three mounting bolts 54 inserted from the inside of the back plate 4 (see FIG. 3). The base plate 6 facilitates the mounting of the applicator head 2 to the appropriate machinery. The cut and seal applicator 24 is pivot mounted to the pivot arm 30, which allows the movement of a couple of degrees so as to affect alignment against a vertical applicator surface shown generally at 56. The vertical surface, in this instance, is a heater element 57 which carries a thermoplastic bag 80 to which a cut ribbon segment (e.g. tie wrap) 59 is to be applied. As the cut and seal applicator 24 cuts and carries the ribbon segment 59, the heater element 57 heats the bag 80 such that the ribbon segment 59 is thermally adhered to the bag 80. In this manner, the ribbon segment 59 can be adhered to the bag at the same instant that a bag seam or seal is formed. As an alternative, two thermal steps can be performed: a first to form the bag seam or seal and a second to adhere the ribbon segment. The vertical surface may also comprise adhering devices other than the aforementioned heater element in other embodiments, as necessary. A small knife pressure spring 58 located in recesses in both the pivot arm 30 and in the cut and seal applicator 24, assures a solid reference surface for the cutting operation at all times.

Figure 3:
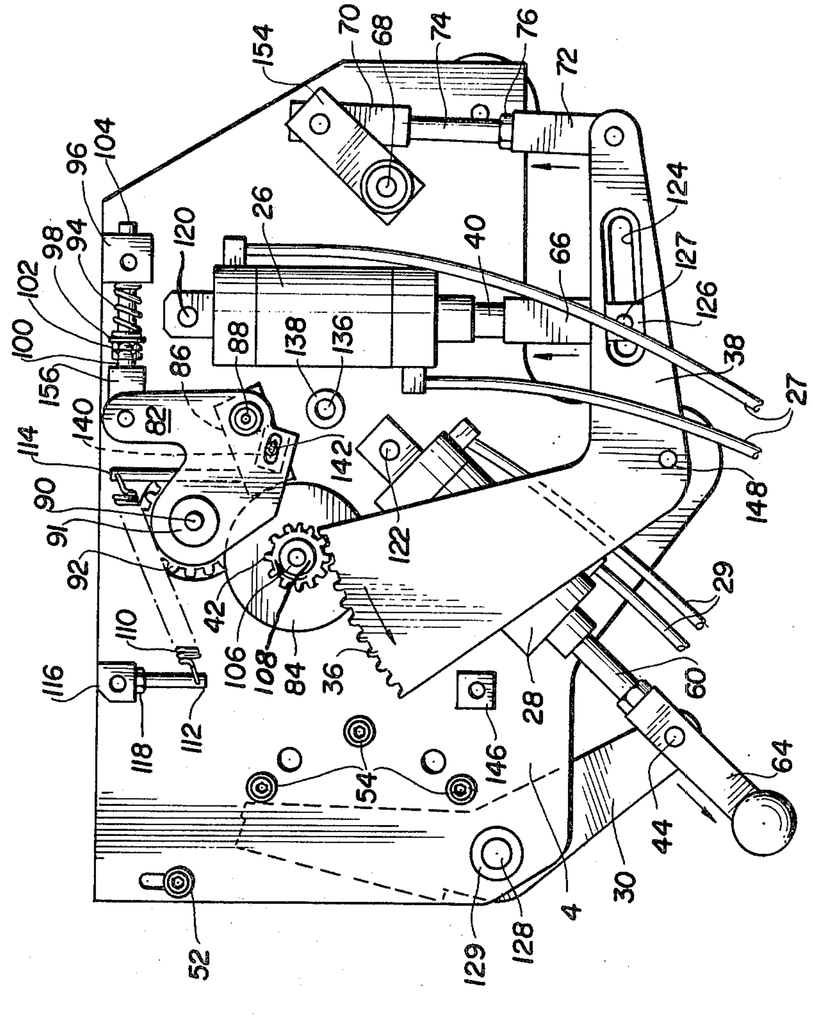
FIG. 3 is a front view of the present invention, with a front plate removed.
Figure 5:
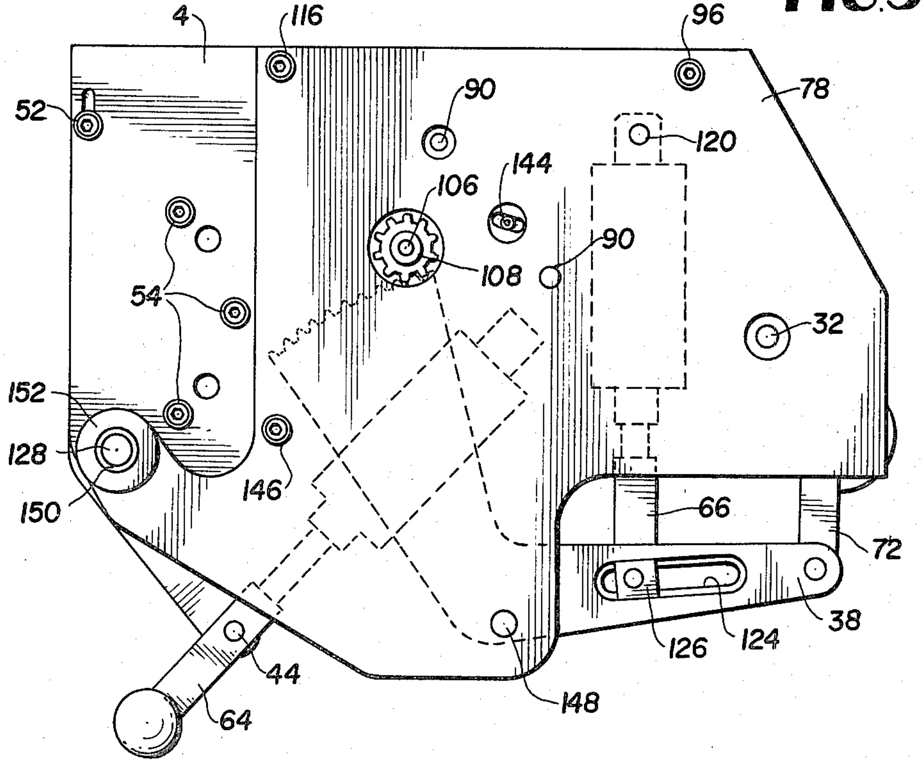
FIG. 5 is a front view of the invention with a mounted front plate.

FIG. 3 shows that the cut and seal pivot arm 30 is connected to ram cylinder 60, via a connecting rod 44 and eyelet 64. See for further reference also FIG. 7, along direction C—C'. The movement of the piston in pneumatic cylinder 26 to be transmitted via ram cylinder 40 and its eyelet 66 to the feed pivot arm 38. The movement of the end of the feed pivot arm 38, upwards or downwards, in turn effects movement of the accumulator shaft 68 via upper 70 and lower 72 linkage eyelets and a connecting accumulator linkage 74 with lock nut 76, seen in FIG. 3, far right hand side. FIG. 3 also shows the inside of the applicator head 2 as seen from the front side, but with the front plate removed. A similar view, but with the front plate 78 in position is shown in FIGS. 5.

FIG. 3 shows the elements in the position after accumulation has been accomplished. After the accumulator parts 70, 72, 74, 76 have returned to their home position (to FIG. 3, from FIG. 2), the ribbon or material is fed through the upper 18 and lower 20 feed rolls into the ribbon guide 22 and in front of the cut and seal applicator 24. Finally, after the ribbon has been cut between the upper 46 and lower 47 knives the ribbon is held between the cut and seal applicator 24 and the reference surface, for instance a bag closure rim 80.

Figure 8:
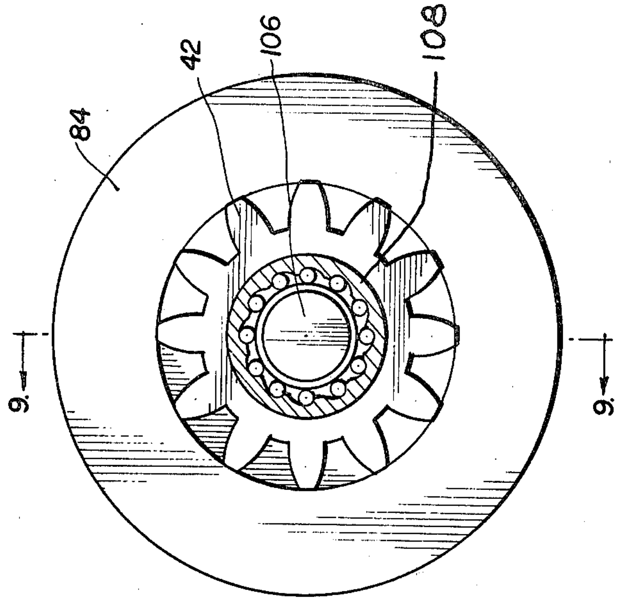
FIGS. 8 and 9 show a detail view of the lower shaft clutch gear.
Figure 9:
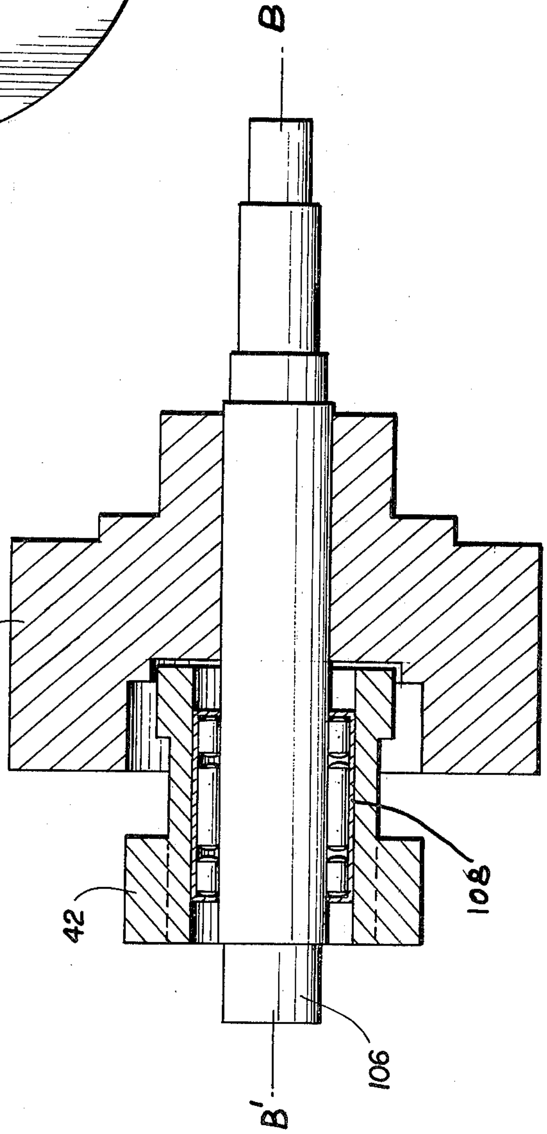

FIG. 3 shows a good detail of the pressure fork 82, brake drum 84 and brake sprag arrangment 86. The double sided pressure fork 82 pivots around the pressure fork pivot shaft 88 and tends to move the pressure fork 82 in a counter clockwise direction as in the view of FIG. 3. An upper feed gear and roll shaft 90 is bearing (91) mounted in the feed pressure fork 82. This upper feed gear and roll shaft 90 carries the upper shaft drive gear 92 and the upper feed roll 18. This detail is best seen in the top view of FIG. 6 and in part also in FIG. 7 along the directions indicated with A—A'. A pressure fork spring 94 mounted between a spacer rod 96 and a spring plate 98 exerts pressure via the pressure fork linkage 100 and pressure fork pressure eyelet 156 onto the pressure fork 82 proper and via the upper feed gear and roll shaft 90 onto the upper 18 and lower 20 feed rolls. The pressure level between the upper 18 and lower 20 feed rolls is adjustable through movement of the lock nuts 102 on the pressure fork linkage 100. A brake sprag 86 is located between the front and back arms of the feed pressure fork 82 and mounted on the pressure fork pivot shaft 88. The brake sprag 86, thus mounted, contacts the brake drum 84, which is mounted on the lower feed gear and roll shaft 106 (see also FIG. 5), onto which the lower feed roll 20 is also mounted. This same axis indicated as the direction B-B' in the Top View, FIG. 6, also carries the lower shaft clutch gear 42 as clearly indicated in FIG. 3. The lower shaft clutch gear 42 is, however, not directly staked to the lower feed gear and roll shaft 106. The movement of the lower shaft clutch gear 42 is transmitted to the shaft 106 via a unidirectional clutch 108. This clutch 108, an integral part of the lower shaft clutch gear, see FIGS. 3, 8 and 9, allows transmission of movement to the lower feed gear and roll shaft 106 only when the lower shaft clutch gear 42 moves in a counter clockwise direction, in the view of FIGS. 3 and 4, as activated by the movement of the gear segment 36 on the pivot arm 38 during the ribbon feeding cycle. For a detail view of the lower shaft clutch gear, see FIG. 8. The front face of the brake sprag 86, which contacts the brake drum 84 has not been machined perpendicular to its top and bottom surfaces, but is cut at an angle several degrees away from perpendicular. As such, the brake sprag 86 exerts a wedging action during the accumulating phase in which backward pull on the ribbon material might force the lower feed gear and roll shaft 106, and thus the brake drum 84, to rotate in a clockwise direction (see arrow on lower shaft clutch gear 42 in FIG. 3). During the feed cycle in which the lower gear and roll shaft 106 the lower shaft clutch gear 42 as well as the brake drum 84 move in a counter clockwise direction, the brake sprag 86 cannot exert a braking action and the various components are free to rotate. The downward contact pressure of the brake sprag 86 onto the brake drum 84 is maintained by a brake spring 110, which is a tension spring and which is mounted between brake spring rod 112 and brake spring rod 114. Brake spring rod 112 is fixedly screwed into spacer rod 116 and held by locknut 118. Brake spring rod 114 is screwed directly into the brake sprag 86. The location of the unidirectional clutch 108 is critical. It should be located in a position between the driving parts and the driven parts. In the preferred embodiment of the invention, the unidirectional clutch 108 and the bearing of the lower shaft clutch gear 42 constitute one unit and are mounted inside the lower shaft clutch gear 42. An alternate location for the unidirectional clutch 108 would be inside the brake drum 84. Location of the uni-directional clutch 108 at any one point beyond this location on either the axes A—A' or B—B' in FIG. 6, would obviate the possibilities of simultaneous rotation of the upper 18 and lower 20 feed rolls via manual activation. The location of the brake sprag 86 can also be advantageously seen in Top View FIG. 6 and Side View, Cut and Feed Side, FIG. 7.

FIG. 3 also shows pneumatic cylinders 26, 28 (driven by a pneumatic source via lines 27, 29, respectively). Cylinder 26 is mounted on a mounting pin 120 which runs from the front plate to the back plate 4. The mounting pin 122 for penumatic cylinder 28 is inserted from the back-side of the back plate 4 (see FIG. 2) and does not run all the way through to the front plate 78 (see FIG. 5). The accumulator shaft 68 runs from the back plate 4 to the front plate 78 and is bearing mounted at the ends of the shaft in either plate. An important detail in FIG. 3 is the feed length adjustment slot 124. The feed length slide nut 126 can be positioned inside the feed length adjustment slot 124 at any one desired position. These positions determine the length of the ribbon to be accumulated, fed and presented to the application (bag closure rim). The position of the feed length slide nut 126 in the feed length adjustment slot 124 can be set with a feed length adjustment bolt, which is part of a slide nut connecting rod 127 and which is located between the feed pivot arm 38 and the pneumatic cylinder eyelet 66. This particular bolt is not visible in FIG. 3. In the preferred embodiment of the invention the ribbon length can run from a maximum of 4 inches to a minimum ribbon length of $2\frac{1}{2}$ inches. The cut and seal pivot arm shaft 128 extends between the back plate 4 and the front plate 78 and is mounted in bearings 129 at either end.

After the ribbon has been fed, the pistons in both pneumatic cylinders 26, 28 are in their lowest position and idler pulley 14 is in its upper position. The gear segment 36 on the feed pivot arm 38 is then moved as far as possible to the right in the view of FIG. 3 and into the extreme position opposite to that shown in FIG. 3 (limited by the position of the feed length slide nut 126 in the adjustment slot 124) to rotate the lower shaft clutch gear 42 in a counter clockwise direction. This movement is tranmitted to the lower feed gear and roll shaft 106 which carries the brake drum 84 and transmits the rotation to the lower 20 and upper 18 feed rolls. After the feed cycle, the piston in pneumatic cylinder 28 is moved upwards. As a result the cut and seal pivot arm 30 is moved forward, the ribbon is sheared off, and is presented to the implement, bag or package.

Figure 4:
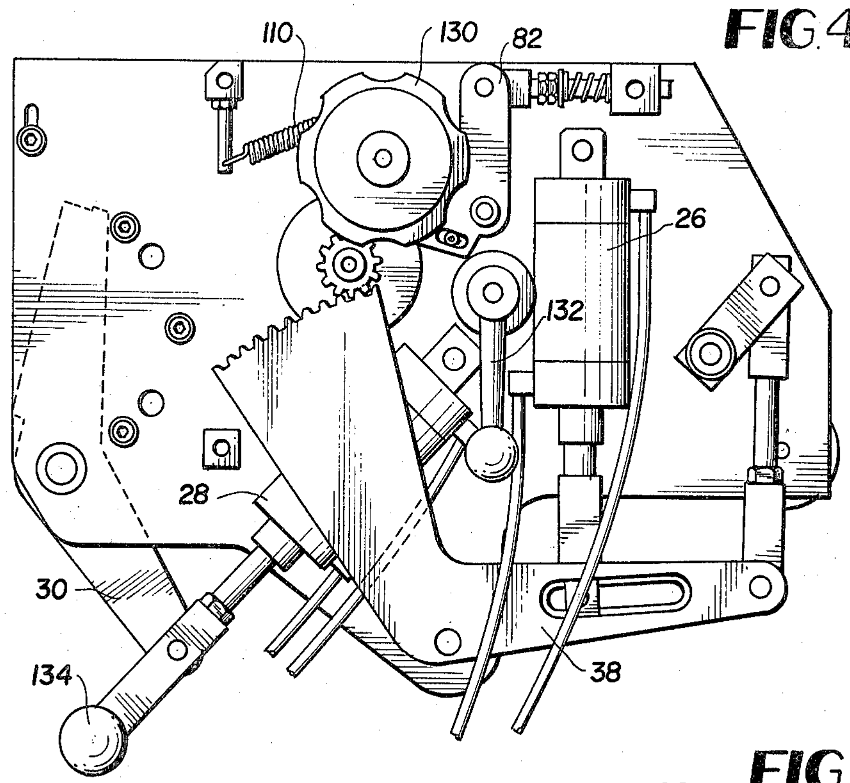
FIG. 4 is also a front view with front plate removed and shows the manual control positions.

FIG. 4 is another view from the front with the front plate 78 removed, looking towards the inside of the back plate 4. The position of all components is as in FIG. 3, that is, just after the accumulation cycle has been finished. The only additional feature is the mounting of the manual feed wheel 130, the manual roll pressure relief lever 132 and the manual cut and seal handle 134. The mounting of the implements for all three manual operations can also be seen in the Side View of FIG. 7. The manual feed wheel 130 is mounted on that portion of the upper feed gear and roll shaft 90 which extends beyond the front plate 78. The actual location and direction is indicated as A—A' in FIGS. 6 and 7. Through rotation of the manual feed wheel 130, it is possible to advance ribbon without pneumatic activation, such as may be necessary at initial installation or the change over from one supply roll to another. The purpose for the manual cut and seal handle also avoids the use of the pneumatic system. Manual operation of the cut and seal handle actuates the cut and seal applicator 24. Upward movement of ram cylinder 60 affects the forward movement of the cut and seal pivot arm 30 and the cutting off of the ribbon. The manual roll pressure relief lever 132 is mounted at the end of the roll pressure relief cam shaft 136, where it emerges through the front plate 78. The cam shaft 136 runs from the front plate 78 to the back plate 4 and only carries an eccentric cam 138 which on rotation will push against a feed pressure wear block 140, as indicated in FIG. 3. The feed pressure wear block 140 is a hardened steel block mounted on the inside of the front arm of the feed pressure fork 82 and is held in position by an Allenhead screw. An Allenhead screw is located in a partial through-slot 142 of the lower part of the feed pressure fork and thus allows for slight adjustments of the position of the feed pressure wear block 140. The feed pressure wear block 140 is thus essentially an extension of the soft aluminum feed pressure fork 82 and prevents undue wear at the contact point with the roll pressure relief cam 138. Use of the manual roll pressure relief lever 132 may be resorted to if it is desired to remove a ribbon from between the pressurized upper 18 and lower 20 feed rolls. The wear block lock screw 144, which secures the feed pressure wear block 140 in place, is indicated in FIG. 5.

FIG. 5 shows the same general view as in FIGS. 3 and 4 but with the front plate 78 mounted. Therefore, FIG. 5 represents a typical front view of a fully assembled ribbon applicator head. The front plate 78 is held on with five mounting bolts, three of which meet up with the spacer rods, 96, 116, 146, while the other two screw into the feed pivot arm shaft 148 and the cut and seal pivot arm shaft 128 respectively. FIG. 5 also shows the position of the cut and seal pivot shaft bearing 150 as well as bearing housing 152. The position of the cut and seal pivot arm shaft 128 between the front 78 and back 4 plates is as indicated in FIGS. 6 and 7, along the directions H—H'.

Figure 6:
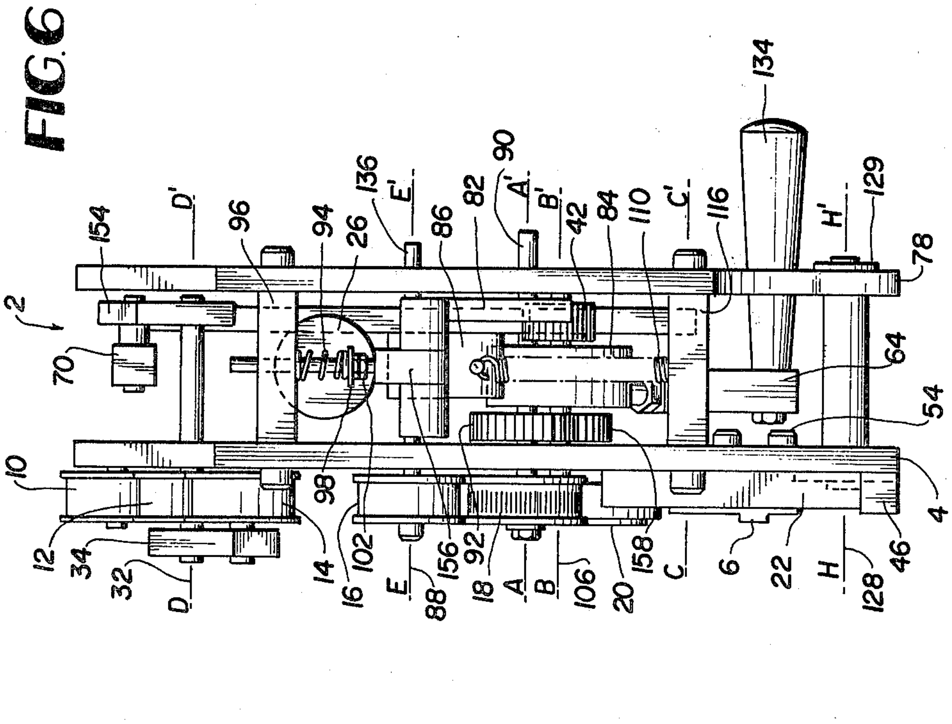
FIG. 6 is a top view of the present invention.

FIG. 6 is a straight-on top view of the ribbon applicator head 2. Direction D—D' is that of the accumulator shaft 32 to which is pinned the accumulator linkage arm 154 and to which the pulley clamp lever 34 is rigidly mounted on the opposite end. The pressure fork linkage eyelet 156 and the geometry of the feed pressure fork 82 are shown best in this figure. Direction E—E' is that of the pressure fork pivot shaft 88, which is held in place by the two Allenhead screws shown on the outsides of the back 4 and front plate 78 along lines E—E'. Direction A—A' is that of the upper feed and gear roll shaft 90. The manual feed wheel 130, the upper shaft drive gear 92 and the upper feed roll 18 are all keyed or fixed to the shaft to affect one assembly. Direction B—B' is that of the lower feed gear and roll shaft 106. Mounted on the shaft 106 are from left to right, (in this particular view) the lower feed roll 20, which is keyed to the shaft, a lower transfer gear 158, (to transfer motion between the upper 18 and lower 20 feed rolls) which itself is pressure fit to an extension of the brake drum 84 which in turn is keyed to the shaft 106 and finally, in the most righthand position just inside the front plate 78, the lower shaft clutch gear 42 which carries on its inside, as one unit, a bearing and uni-directional clutch assembly 108. It merits repeating that the lower feed gear and roll shaft 106, the brake drum 84 and the lower transfer gear 158, which is pressure fitted to the drum 84, and the lower feed roll 20 form one assembly that will rotate in one direction only and that this assembly is prevented from rotation in the opposite direction by the action of the brake sprag 86 on the brake drum 84. The lower feed gear and roll shaft 106 will rotate in one direction only as allowed by the uni-directional clutch 108. This direction is also the direction desired for feeding the ribbon between the lower 20 and upper 18 feed rolls. When the lower clutch gear 42 is rotated in the opposite direction it merely freewheels on the shaft 106. Direction C—C' is merely that of the cut and seal pivot arm connecting rod 44 which connects the cut and seal pivot arm 30 to the pneumatic cylinder eyelet 64. Direction H—H' is that of the cut and seal pivot arm shaft 128 around which the cut and seal pivot arm 30 rotates. As viewed in FIG. 6, the lonitudinal axis of the roll pressure relief cam shaft 136 is located just below the pressure fork pivot shaft 88 which is positioned along direction E—E'. The feed pivot arm shaft 148 is located straight below and approximately half way between directions A—A' and B—B' in FIG. 6.

Figure 7:
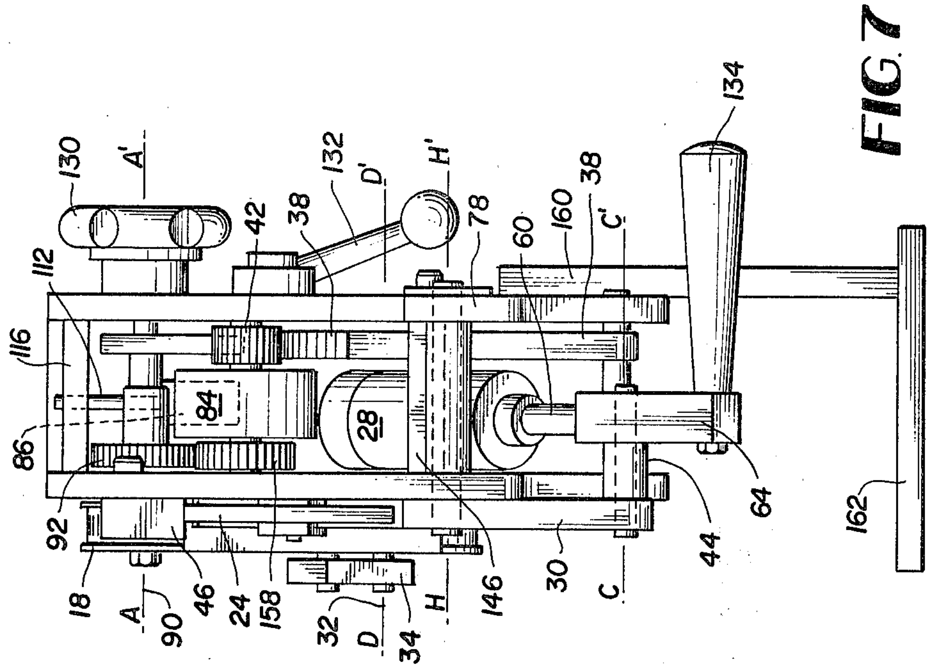
FIG. 7 shows a side view of the invention.

FIG. 7 shows a side view from the cut and feed side. This Figure shows a very good view of the brake drum 84. Direction A—A' is that of the upper feed and gear roll shaft 90 and shows all the components mounted thereto, which are from left to right, the upper feed roll 18, the upper drive gear 92, and on the far righthand side the manual feed wheel 130. The point at which the shaft 90 passes through one of the arms of the feed pressure fork 82 is also clearly visible. It can be seen that the mounting bracket 160 and the mounting bracket base plate 162 are merely present for purposes of supporting the main assembly. Note also the massive execution of the lower end of the feed pivot arm 38 between the front 78 and back 4 plate.

It should be noted that the foregoing is merely an exemplary embodiment of the present invention and variations of this embodiment are possible within the scope of the invention. For instance, the ribbon applicator head may be activated mechanically, electronically or electrically, rather than pneumatically. The dimensions of the feed length adjustment slot (124) in the feed pivot arm 38 may be altered to provide a geater range of ribbon lengths. Also, the single-directional brake element (which prevents the ribbon from feeding backwards) may be realized as a ratchet brake, a rap band brake, or a contour drum brake.

What is claimed and desired to be secured by Letters Patent of the United States is:

1. In an item processing machine having an adhering element, a supply of ribbon-like material and an applicator head for processing the ribbon-like material, wherein the applicator head includes:

an activator means connected to control operation of the applicator head;

a guide means for guiding the ribbon-like material;

a blade means for cutting the ribbon-like material;

an accumulating means connected to the activator means such that in a first state the accumulating means accumulates a pre-selected length of ribbon-like material, and such that in a second state the accumulating means feeds the ribbon-like material to the guide means;

an applicating means positioned to receive the ribbon-like material from the guide means, and connected to the activator means to be activated by the activator means such that the applicating means engages the blade means to cut the ribbon-like material and presents the ribbon-like material to the adhering element, which adheres the ribbon-like material to the item.

2. In a processing machine as defined in claim 1, wherein the activator means includes first and second pneumatic cylinders, wherein the first pneumatic cylinder in a first state is connected to activate the accumulating means, and the second pneumatic cylinder is connected to activate the applicating means.

3. In a processing machine as defined in claim 2, wherein the accumulating means includes a pivot arm having a geared portion connected to be activated by the first pneumatic cylinder, a set of feed gears which engages the pivot arm geared portion, and a set of feed rolls connected to be activated by the set of feed gears, wherein when the first pneumatic cylinder is in a second state, the pivot arm geared portion drives the set of feed gears to feed the ribbon-like material through the set of feed rolls to the guide means.

4. In a processing machine as defined in claim 3, wherein the accumulating means also includes a set of pulleys mounted on a clamp lever connected to the pivot arm such that when the first pneumatic cylinder is in the first state the clamp lever shifts the set of pulleys to accumulate a preselected length of ribbon-like material.

5. In a processing machine as defined in claim 4, wherein the applicating means includes an applicator arm which, when activated by the second pneumatic cylinder, carries the ribbon-like material received from the guide means, engages the blade means such that the ribbon-like material is cut, and presents the cut ribbon-like material to the adhering element.

6. In a processing machine as defined in claim 1, wherein the accumulating means also includes a clutch means which allows for positive engagement and subsequent activation of the feeding means on rotation in one direction only, so as to feed the ribbon like material in the desired direction.

7. In a processing machine as defined in claim 6, wherein the accumulating means includes a pivot arm having a slidable connection means to which a pneumatic cylinder is connected for activating the accumulating means and wherein the position of the slidable connection means determines the length of the pre-selected length of ribbon-like material accumulated by the accumulating means.

8. In a processing machine as defined in claim 7, wherein the adhering element comprises a heating element which thermally adheres the cut ribbon-like material to the item.

9. In a processing machine as defined in claim 1, wherein the accumulating means also includes a brake means which allows rotation of the feeding means assembly in the desired positive engagement direction, but prevents rotation of the feeding means assembly in the direction opposite thereto, thereby making it impossible for the ribbon-like material to feed backwards.

10. A method of applying a ribbon-like material to an item with an item processing machine having an adhering element, a supply of ribbon-like material and an applicator head which includes: an accumulating means; a feeding means; a guide means; an applicator means; an activator; and a blade means; the steps including:

operating the accumulating means, the feeding means, and the applicator means with the activator;

accumulating a pre-selected length of ribbon-like material from the supply of ribbon-like material with the accumulating means;

feeding the accumulated ribbon-like material with the feeding means into the guide means;

guiding the accumulated ribbon-like material to the applicator means with the guide means;

cutting the accumulated ribbon-like material by engaging the blade means with the applicator means;

presenting the cut ribbon-like material with the applicator means to the adhering means;

adhering the cut ribbon-like material to the item while forming a package seam in the item with the adhering means.

11. A method as described in claim 10, wherein the activator includes first and second pneumatic cylinders, the steps also including:

operating the accumulating means with the first pneumatic cylinder during a first activation stage of the first pneumatic cylinder;

operating the feeding means with the first pneumatic cylinder during a second actuation stage of the first pneumatic cylinder; and operating the applicator means with the second pneumatic cylinder.

12. A method as described in claim 11, wherein the accumulating means includes a pivot arm with a geared portion, a set of pulleys mounted on a clamp lever, a set of feed gears, and a set of feed rolls, the steps also including:

operating the pivot arm in a first direction with the first pneumatic cylinder;

shifting the set of pulleys via the clamp lever by operating the pivot arm in a first direction to accumulate the pre-selected length of ribbon-like material;

operating the pivot arm in a second direction with the first pneumatic cylinder; and driving the set of feed gears with the pivot arm geared portion while the pivot arm operates in the second direction;

actuating the set of feed rolls via the set of feed gears to feed the accumulated ribbon-like material into the guide means.

13. A method as described in claim 12, wherein the accumulating means inludes a clutch means the step also including:

positively engaging the set of feed gears and feed rolls so as to feed the ribbon-like material from its position in the accumulating means in a direction towards the guide and applicator means.

14. A method as described in claim 13, wherein the pivot arm has a slidable connection means to which the first pneumatic cylinder is connected, the steps also including:

selecting the length of ribbon-like material according to the position of the slidable connection means relative to the pivot arm.

15. A method as described in claim 14, wherein the adhering means comprises a heating element, the steps also including:

simultaneously heating the cut ribbon-like material and the package seam, to adhere the cut ribbon-like material to the package seam.

16. A method as described in claim 12, wherein the accumulating means includes a brake means the steps also including:

engaging the feed means with the brake means so as to prevent back feeding of the ribbon-like material.

* * * * *